United States Patent [19]
Pike

[11] 3,866,055
[45] Feb. 11, 1975

[54] LASER DOPPLER VELOCIMETRY
[75] Inventor: Edward Roy Pike, Malvern, England
[73] Assignee: National Research Development Corporation, London, England
[22] Filed: Jan. 15, 1974
[21] Appl. No.: 433,533

[30] Foreign Application Priority Data
Jan. 17, 1973  Great Britain...................... 2416/73

[52] U.S. Cl..................... 250/564, 250/574, 356/28
[51] Int. Cl. ......................... G01n 21/30, G01p 3/36
[58] Field of Search ...... 250/564, 574, 575; 356/28; 73/194 E

[56] References Cited
UNITED STATES PATENTS
3,548,655  12/1970  Rudd .................................. 356/28
3,753,616   8/1973  Goethert............................. 356/28

FOREIGN PATENTS OR APPLICATIONS
1,953,630   4/1970  Germany............................. 356/28

OTHER PUBLICATIONS
Abbiss et al., "Laser Anemometry in an Unseeded Supersonic Wind Tunnel by Means of Photon Correlation Spectroscopy of Backscattered Light," J. Phys. D: Appl. Phys., Vol. 5, (1972).

Primary Examiner—James W. Lawrence
Assistant Examiner—T. N. Grigsby
Attorney, Agent, or Firm—Cushman, Darby & Cushman

[57] ABSTRACT

The velocity of fluid flow is measured by focussing twin beams of radiation to intersect at an area of interest, the radiation being in the form of very short pulses of highly coherent wavelengths, radiation scattered from fluid moving through the said intersection being directed into a detector whose output is fed into a single processor, range gating means being provided for allowing the signal processor to process signals representing the short pulses of radiation scattered from the said intersection of radiation beams.

6 Claims, 6 Drawing Figures

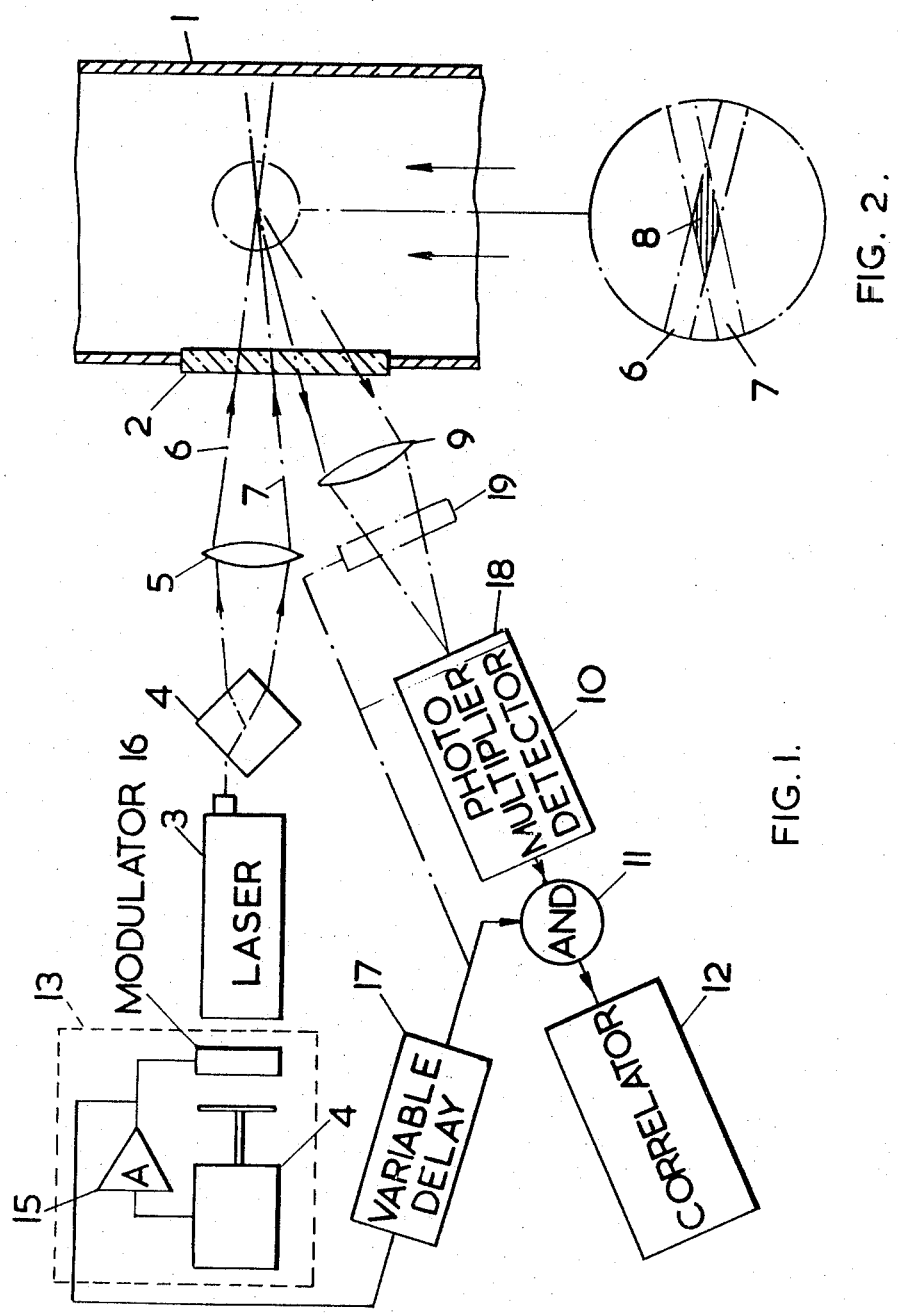

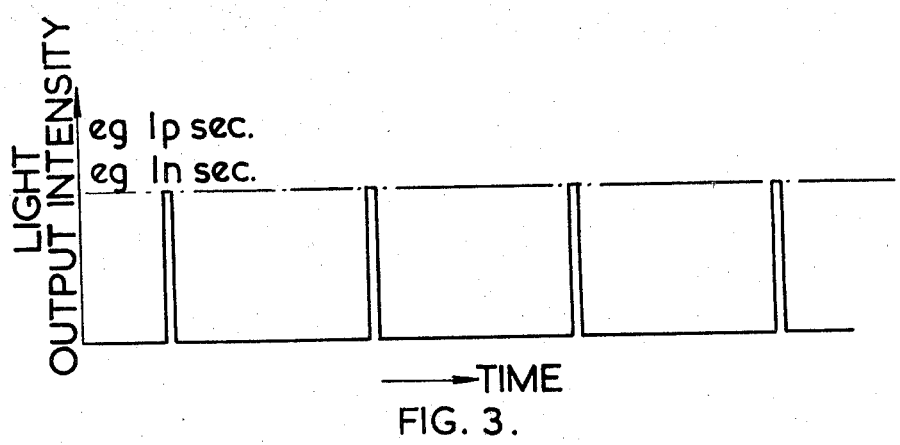
FIG. 3.
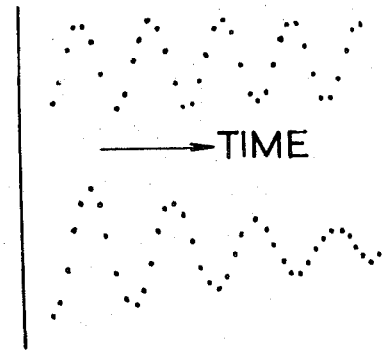
FIG. 4a.
FIG. 4b.
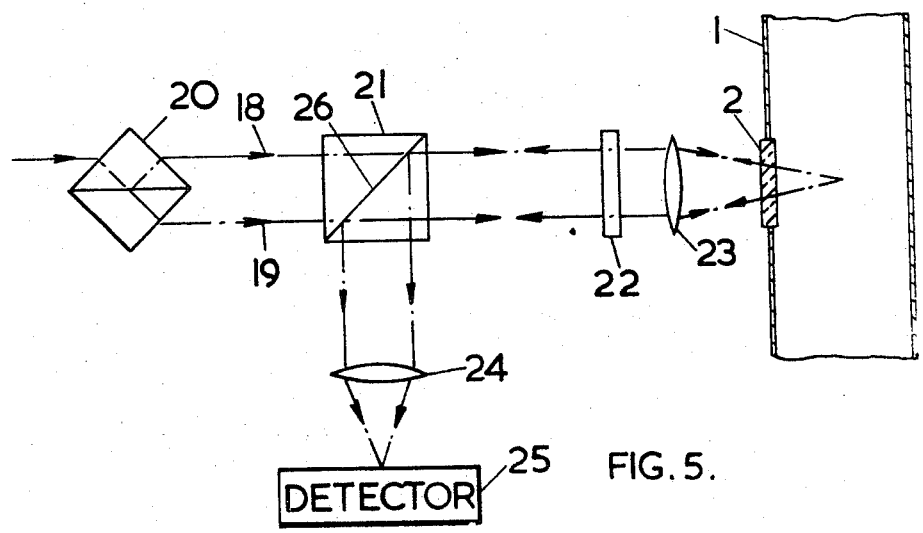
FIG. 5.

LASER DOPPLER VELOCIMETRY

This invention relates to the measurement of fluid flow generally, and in particular to the flow of gas through a wind tunnel, by the use of laser doppler velocimetry.

Conventionally fluid flow is measured by pitot tubes or flow meters placed in the body of fluid being measured.

Another way of measuring air flow in a wind tunnel is described in *Journal of Physics D Applied Physics*, Volume 5. This makes use of a real fringe interference system in which the Doppler signal arises from backward scattering of dust particles naturally present in the atmosphere. Twin convergent beams of continuous light are fed from a laser through a window into the wind tunnel to illuminate the inside of the tunnel. Light reflected by dust particles at the intersection of the light beams is received by a photon correlator whose output gives the Doppler signal indicating the speed of air flow within the wind tunnel.

One problem with the above is the scattering of light from the window and the inside surfaces of the wind tunnel. This makes it difficult to detect ths small Doppler signals indicating air flow speed in the tunnel.

The word conduit as used in this specification is intended to include any type of guiding surface for transporting fluid and includes pipes, tubes, wind tunnel, etc.

According to this invention velocity of fluid flow is measured by focussing twin beams of radiation to intersect at an area of interest, the radiation being in the form of very short pulses of highly coherent wavelengths, radiation scattered from fluid moving through the said intersection is directed into a detector whose output is fed into a signal processor, range gating means being provided for allowing the signal processor to process signals representing the short pulses of radiation scattered from the said intersection of radiation beams.

Apparatus for measuring fluid flow according to this invention includes a source of highly coherent radiation capable of fiving an output beam of very short pulses of radiation, a beam splitter for producing twin beams of radiation from the said source, focussing surfaces for causing the twin beams to intersect where required, a detector for detecting radiation scattered off particles moving through the intersection, a signal processor for receiving signals from the detector, and range gating means for allowing the signal processor to process signals representing radiation scattered from the said intersection.

Conveniently the short pulses of radiation are provided by a phase locked laser operating in the visible or infra red part of the spectrum.

The signal processor may be a photon correlator such as that described in U.K. Patent Specification 1,290,336, a laser doppler processor, a wave analyser, a frequency tracker, or counter and integrator.

The invention will now be described by example only with reference to the accompanying drawings in which:

FIG. 1 is a schematic view showing measurement of air flow in a wind tunnel;

FIG. 2 is an enlarged view of part of FIG. 1;

FIG. 3 is a diagram of the output from the phase locked laser;

FIGS. 4a, b show typical outputs from the correlator;

FIG. 5 is a schematic view showing an alternative arrangement to that shown in FIG. 1.

FIG. 1 shows a wind tunnel 1 in which measurement of air velocity is to be made. A window 2 of good optical quality is provided in a side wall of the tunnel. A phase locked laser 3 (e.g., a 15 milliwatt argon laser) directs its output through a beam splitting cube 4 and a focussing lens 5 into the inside of the tunnel 1. The two outputs 6, 7, from the focussing lens 5 can be focussed to intersect at any position across the width of the wind tunnel 1, to form a set of interference fringes 8 shown enlarged in FIG. 2. Light scattered off particles passing through the fringes 8 is reflected back and focussed by a lens 9 into a photomultiplier detector 10 whose output passes through an AND-gate 11 into a correlator 12 such as the one described in U.K. Patent No. 1,290,336. In the illustrated form of phase locked laser the laser 3 has a detector 14 whose output passes through an amplifier 15 to a modulator 16 for causing the output of the laser 3 to be phase locked and deliver an output such as that shown in FIG. 3 with a pulse length of less than 1 nanosecond at a period of every 10 nanoseconds. A signal is extracted from the laser detector amplifier 15 and fed through a variable delay 17 into the AND-gate 11.

In operation air or other gas flows through the wind tunnel 1. Particles within this air flow pass through the fringes 8 and scatter light modulated at a frequency which is linearly dependent on the velocity component of the particle perpendicular to the fringes 8. The distance between fringes $t$ can readily be shown to be $\lambda/\theta$ for small angles of $\theta$, where $\theta$ is the angle between the two beams 6, 7 and $\lambda$ the wavelength of the laser 3 output. Thus velocity will be frequency of modulation times fringe space ($t$).

Put another way, the particles scatter light from each beam 6, 7 which interferes constructively or destructively with light received by the detector 10. These scattered signals from the two beams 6, 7 are both doppler shifted in frequency from the laser beam frequency. Such a difference doppler frequency can readily be shown to be independent of angle between the two beams 6, 7.

The window 2 reflects light to varying extends from both its surfaces 2a, 2b, also light is scattered from the inside of the wind tunnel 1 and any model placed therein. This scattered light is of the same magnitude as the light which is needed for measuring the air flow velocity. To overcome this scatter the correlator 12 is switched on or range gated by adjustment of the variable delay 17 so that it is in an on condition only when light is received from the position at the intersection 8 of the laser beams 6, 7. Thus any light received in the period between pulses represents scattered light and is not processed by the correlator 12. The scattered light may originate from the surfaces of the window 2, the beam splitter 4, and focussing lenses 5, 9. By range gating the correlator 12 and varying the intersection of the twin laser beams 6, 7 the air velocity across the width of the wind tunnel 1 can be measured. The length of light pulses determines the minimum useful distance between intersection of the light beams and a reflecting surface. For example the 1 nanosecond pulse allows a resolution of about 6 inches, one half the length of light pulse. Use of a short pulse phase locked laser, as opposed to a continuous laser in the prior art, enables a much lower powered laser to be used. This is because the laser only provides an output for the short time required by the signal processing. The period between light pulses is preferably arranged to equal the dead or paralysis time of the signal processor. For example with a photo correlator such as described in U.K. Patent No. 1,290,336 the paralysis time may be around 10 nanoseconds.

FIGS. 4a, b show typical outputs from the correlator as displayed for example on a cathode ray tube. The output is a cosine wave whose frequency is the same as the frequency of the scattered signal. FIGS. 4a and 4b show outputs for non-turbulent and turbulent flow respectively; the turbulence appears as a dampening of the cosine wave and is usefully measured for some applications by standard techniques. Decreasing the pulse width to for example 1 pico second and range gating the correlator 12 for a correspondingly small time interval will allow even finer range discriminations across the wind tunnel.

FIG. 1 shows how the air flow can be measured by a back scattering of light from illuminating particles from within an airflow. In a modified form the wind tunnel 1 is provided with a second window almost opposite the window shown in FIG. 1 and the light scattered from illuminated particles at the intersection of the laser beams 6, 7 in a forward direction is measured by the detector and correlator located behind this second window. The advantage of the apparatus shown in FIG. 1 is that only one window is necessary and this is of importance when high temperature, pressure, and air flow are passing through the tunnel.

Other ways of gating the light from the particles in the tunnel are shown by broken lines in FIG. 1. They include electrically gating 18 the photomultiplier 10 or by gating an optical shutter 19 placed between the photomultiplier and the focussing lens 9, such an optical shutter 19 could be a Kerr cell.

An alternative way of providing a gating signal is to sample the light output from the laser at the beam splitter and pass this through an optical detector such as a photo-diode the output of which is fed into the variable delay and thence to the AND-gate 11.

As noted above range gating reflected signals from the intersection by the laser beams enables reflections or flares from the windows, lenses etc to be eliminated. In addition to removing the problem of wind tunnel window reflection the invention enhances Doppler signal processing by the 180° reflection configuration (FIG. 5). This is a particularly useful technique for investigating fluid flow in furnaces etc since it allows measurement deep inside an oven through a small apperture and has a simple optical system.

FIG. 5 shows an alternative arrangement for measuring air flow in a wind tunnel 1 by 180° back scattering. Polarised light from a phase locked laser (not shown) is split into twin beams 18, 19 in a beam splitting cube 20 and then passed through a polarising beam splitter 21 which is arranged to transmit almost 100 percent of this polarised light into a quarter wave plate 22. This quarter wave plate 22 rotates the plane of polarisation of the light beams 18, 19 through 45°. From the quarter wave plate 22 the twin beams 18, 19 are focussed by lens 23 to intersect in the wind tunnel 1. Light reflected 180° off particles at the intersection is directed by the lens 23 into the quarter wave plate 22, where its plane of polarisation is rotation by 45°. This reflected light is thus polarised at 90° to the light transmitted from the laser and is therefore almost 100 percent reflected by the polarising beam splitter 21 at its reflecting surface 26 into a second focussing lens 24 and a photo detector 25. The detector may be range gated electronically or optically in the same manner as the detector described with reference to FIG. 1 to avoid processing of reflections from the polarising beam splitter 21, quarter wave plate 22, lenses 23, 24, and window 2.

In another arrangement of FIG. 5 the laser 3 and beam splitter 20 are interchanged with the detector 25 and lens 24 so that laser radiation is reflected into the tunnel 1 and transmitted into the detector 25.

Use of a phase locked laser and a gating system allows accurate measurement of air flow within the wind tunnel without the need to seed the air with large particles in order to get a large reflected signal for processing by for example a waveform analyser.

In prior art continuous wave laser apparatus using 180° back scattering measurements small holes are provided in a reflecting surface 26 through which light 18, 19 from a laser may pass. These small holes reduce the problem of flare from the reflector 26. But when the diameter of the light beams 18, 19 is made large in order to obtain a desired intersectional area 8 the size of holes required is comparable with the size of the reflecting surface 26 and a polarising beam splitter such as 21 (without holes) becomes necessary. The surface 26 is then a source of flare or unwanted reflections. These reflections may then be rendered harmless by the arrangement described in FIG. 5. Use of a phase locked laser and range gating is therefore still of use even when the laser beams are not being directed through windows.

Thus a relatively small portable self contained arrangement may be constructed to operate by the 180° back scattering technique for measurement of gas flow. Such an arrangement could be moved as a complete unit and pointed at the position requiring measurement. For example measuring the exhaust flow from jet or rocket engines across an airfield; gas flow within a furnace; clear air turbulence in front of an aircraft (using a laser operating in the infra red region of the spectrum).

I claim:

1. Apparatus for measuring fluid flow comprising source of highly coherent radiation capable of giving an output beam of very short pulses of radiation, means for splitting the output beam into twin beams, means for causing the twin beams to intersect where required, means for detecting and producing a signal representative of radiation scattered by particles moving through the intersection of the twin beams, means for processing the signal from the means for detecting radiation to provide a Doppler signal representing the velocity of fluid flow through the said intersection, and means for range gating the scattered radiation so that only radiation scattered from the intersection is processed.

2. Apparatus as claimed in claim 1 wherein the source of highly coherent radiation is a phase locked laser.

3. Apparatus as claimed in claim 1 wherein the detector is a photomultiplier.

4. Apparatus as claimed in claim 1 wherein the detector is a photodiode.

5. Apparatus as claimed in claim 1 wherein the means for processing the signal from the detector is a photon correlator.

6. Apparatus for measuring velocity of fluid flow comprising a phase locked laser a beam splitter for splitting output from the laser into two beams, means for causing the two beams to intersect where required, a polarising beam splitter which transmits radiation polarised in a first plane and reflects radiation polarised in a second plane orthogonal to the first plane, a quarter wave plate for rotating the plane of polarisation of radiation received from the polarising beam splitter, a photo multiplier detector arranged to receive from the polarising beam splitter radiation scattered from the intersection of the beams through the quarter wave plate to the polarising beam splitter a photon correlator for receiving the output from the detector to provide an output representing the velocity of particles moving through the intersection, and range gating means for allowing the correlator to process only radiation scattered from the intersection of the laser beams.

* * * * *